(No Model.)

C. F. STILLMAN.
FOOT REST FOR VEHICLES.

No. 244,403. Patented July 19, 1881.

WITNESSES:

INVENTOR
Charles F. Stillman
BY Park Benjamin & Bro
his ATTORNEYS.

UNITED STATES PATENT OFFICE.

CHARLES F. STILLMAN, OF PLAINFIELD, NEW JERSEY.

FOOT-REST FOR VEHICLES.

SPECIFICATION forming part of Letters Patent No. 244,403, dated July 19, 1881.

Application filed February 19, 1881. (No model.)

*To all whom it may concern:*

Be it known that I, CHARLES F. STILLMAN, of Plainfield, in the county of Union and State of New Jersey, have invented a new and useful Improvement in Foot-Rests for Vehicles, of which the following is a specification.

The invention relates to the rests or stirrups used as supports for the feet of the driver of a vehicle; and it consists of loops or projecting bars secured to braces extending between the forward part of the vehicle-seat and the shaft. The said rests are preferably made adjustable along the braces, and to this end are provided with sleeves sliding on the latter, and with fastening devices for holding them in place after adjustment. The braces are so formed that the rests may be secured at any desired point along them to suit the physical peculiarities or the position taken by the occupant of the seat.

The invention is more particularly intended for use with my improved sulky for which Letters Patent have recently been granted me, and which vehicle is so constructed that the driver's seat, instead of being located in rear of the horse, is placed above and over the animal.

Figure 1:
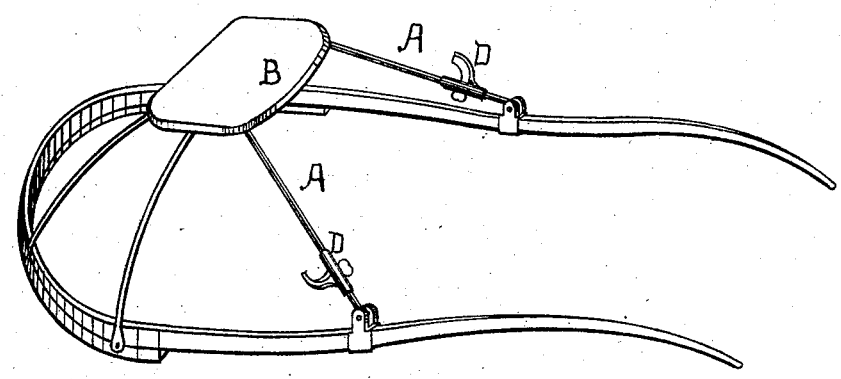
Figure 2:
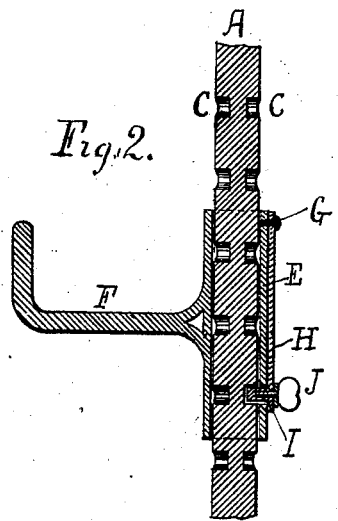
Figure 3:
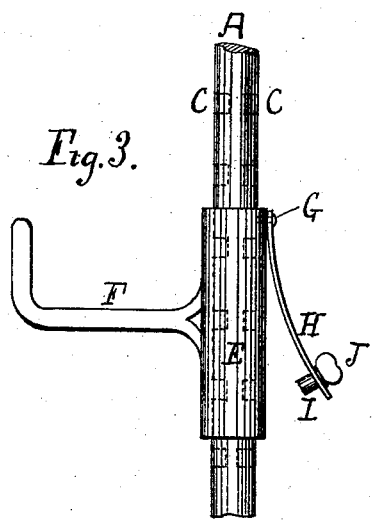
Figure 4:
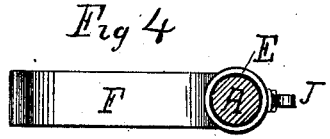

In the accompanying drawings, in which similar letters of reference indicate like parts, Figure 1 is a perspective view, showing the seat-braces, shafts, and rearwardly-curved axle of my improved sulky, and also embodying my present invention. Fig. 2 is a vertical longitudinal section of the foot-rest or stirrup, and of part of the brace upon which the latter slides, showing the spring-acted securing-pin in place. Fig. 3 is an external view of the stirrup or foot-rest, and part of the brace, showing the spring-acted securing-pin withdrawn. Fig. 4 is a transverse horizontal section of the brace and stirrup-sleeve, and also embodies a plan view of the projecting portion which receives the foot.

A are braces, secured at their upper ends in any suitable manner to the front portion of the seat B, Fig. 1. Their lower ends may be secured to the shafts, preferably at points about opposite to the position of the saddle on the horse when the animal is hitched to the vehicle. The location of this fastening should, in any case, be such as to give ample length to the braces A, to allow the stirrups to be adjusted on them, as hereinafter described, to suit any ordinary length of leg. In the braces A are formed rows or lines of indentations or recesses C, as shown in section in Fig. 2, which recesses receive the fastening-pins of the stirrups or foot-rests.

D, Fig. 1, are the stirrups or rests. Each stirrup consists of a metal sleeve, E, Fig. 2, upon one side of which is formed or suitably attached the portion F, which receives the foot or against which the foot is pressed. On the opposite side of the sleeve E is attached, by a pin or rivet, G, or by other suitable means, the spring H. Said spring is fastened by pin or rivet G at one end. At its other and free end it carries a pin, I, provided with a handle, J, for convenience in operation. The pin I is adapted to pass through a hole in the sleeve and into any one of the recesses C in the brace A. The sleeve E moves easily along the brace A, so that the entire stirrup, when the pin I is withdrawn, as shown in Fig. 3, may be readily moved to any desired point along said brace. When adjusted as described the stirrup is held in place and prevented from sliding or turning by means of the pin I entering one of the holes C. In this manner the stirrup may be adjusted and fastened on the brace A to suit the length of leg of, or the position taken by, the occupant of the seat. The object of having two lines of recesses C on the braces A, as shown in Fig. 2, is to enable the stirrup to be secured after it has been turned around or rotated, so as to protrude inside instead of outside the brace. Another adjustment of the device in accordance with the physical peculiarities of the user is thus rendered available.

I do not limit myself to a foot-rest necessarily movable on the brace A, as it is evident that substantially the same result and object would be attained by permanently fixing a series of stirrups or rests at different points along said brace, which arrangement would offer some advantages in case of the driver wishing quickly to change the point of support of his feet in order to get a different purchase. Neither do I confine myself to a mode of fastening the stirrup upon the brace, which shall necessarily be easily detachable, as it may be advantageous in some circumstances to secure the stirrup permanently in place after its adjustment.

I am aware that foot-rests have been attached to the shafts of trotting-sulkies, and also that foot-rests have been constructed so as to be adjustable to suit the length of leg or position of the driver. These features I do not broadly claim; but

What I claim as new, and desire to secure by Letters Patent, is—

1. The combination of a brace or stay extending forward and downward from the front portion of a vehicle-seat, with a foot-rest or foot-rests secured and movable thereon, substantially as specified.

2. The combination, in a vehicle, of the seat, shafts, and forwardly-extending braces between said shafts and seat, with foot-rests or stirrups arranged so as to be adjustable along, and to be secured at any desired point on, said braces, substantially as specified.

3. The combination, in a vehicle, of a brace, stay, or rod having indentations or recesses therein, and a stirrup or foot-rest adapted to slide on said brace, stay, or rod, and to be held at any desired point thereon by devices engaging with or in said recesses or indentations, substantially as specified.

4. A stirrup or foot-rest consisting of a sleeve and a projecting support for the foot formed or secured thereon, in combination with devices for securing the same at any position or desired point on or along a brace or rod passing through the sleeve, substantially as specified.

5. The combination, in a vehicle, of a brace attached to and extending forwardly from the seat and having two or more rows of indentations on different sides, with a stirrup or foot-rest adapted to be turned or rotated or adjusted on said brace, so as to project from and be secured on either recessed side thereof, substantially as specified.

6. The combination, in a vehicle, of the seat B, braces A, and stirrups or foot-rests D, substantially as specified.

7. The combination, in a vehicle, of the seat B, braces A, stirrups or foot-rests D, and shafts, substantially as specified.

8. The combination, in a stirrup or foot-rest, of the sleeve E, foot-support F, fastening rivet or pin G, spring H, and pin I, substantially as specified.

CHAS. F. STILLMAN.

Witnesses:
CHAS. A. HESS,
EUGENE BANTA.